US008781684B2

(12) United States Patent
Bruce

(10) Patent No.: US 8,781,684 B2
(45) Date of Patent: Jul. 15, 2014

(54) STEERING AND CONTROL SYSTEMS FOR A THREE-WHEELED VEHICLE

(71) Applicant: Alpha Motors Company Limited, Tortola (VG)

(72) Inventor: Ian A. Bruce, Dana Point, CA (US)

(73) Assignee: Alpha Motors Company Limited, Tortola (VG)

( * ) Notice: Subject to any disclaimer, the term of this patent is extended or adjusted under 35 U.S.C. 154(b) by 0 days.

(21) Appl. No.: 13/939,152

(22) Filed: Jul. 10, 2013

(65) Prior Publication Data
US 2014/0019006 A1 Jan. 16, 2014

Related U.S. Application Data

(60) Provisional application No. 61/670,074, filed on Jul. 10, 2012.

(51) Int. Cl.
*B62D 61/08* (2006.01)

(52) U.S. Cl.
USPC .............. 701/41; 701/82; 180/210; 180/215; 280/5.5; 280/5.506; 280/5.509; 280/5.51; 280/6.15

(58) Field of Classification Search
None
See application file for complete search history.

(56) References Cited

U.S. PATENT DOCUMENTS

| 2,152,938 A | 4/1939 | Welch |
| 2,791,440 A | 5/1957 | Guidobaldi |
| 2,878,032 A * | 3/1959 | Hawke .......................... 280/282 |
| 3,277,840 A | 10/1966 | Li |
| 3,442,526 A | 5/1969 | Olson |
| 3,485,506 A | 12/1969 | Melbar |
| 3,504,934 A | 4/1970 | Wallis |
| 3,712,404 A | 1/1973 | Walquist |
| 3,938,609 A | 2/1976 | Kensaku et al. |
| 4,020,914 A | 5/1977 | Trautwein |
| 4,064,957 A * | 12/1977 | Parham ......................... 180/215 |
| 4,316,520 A | 2/1982 | Yamamoto et al. |
| 4,423,795 A | 1/1984 | Winchell |

(Continued)

FOREIGN PATENT DOCUMENTS

| DE | 3611417 A1 | 10/1987 |
| EP | 0626307 B1 | 12/1998 |

(Continued)

OTHER PUBLICATIONS

Langenwalter, et al. "Embedded Steer-By-Wire System Development", Embedded World, Feb. 17-19, 2004, Nuremberg, Germany.

(Continued)

*Primary Examiner* — Jonathan M Dager
(74) *Attorney, Agent, or Firm* — Leydig, Voit & Mayer, Ltd.

(57) ABSTRACT

A three-wheeled vehicle that includes: a single front wheel; two rear wheels; a passenger cabin; an electronic steering control unit; and a steering input device configured to send an electronic signal to the electronic steering control unit corresponding to an input received at the steering input device associated with turning the three-wheeled vehicle; wherein the electronic steering control unit is configured to counter-steer the front wheel in response to receiving the electronic signal, wherein the counter-steering of the front wheel initiates a leaning of the passenger cabin a direction of turning of the three-wheeled vehicle.

20 Claims, 10 Drawing Sheets

(56) References Cited

U.S. PATENT DOCUMENTS

| | | | |
|---|---|---|---|
| 4,484,648 A * | 11/1984 | Jephcott | 180/210 |
| RE32,031 E | 11/1985 | Winchell | |
| 4,624,469 A | 11/1986 | Bourne, Jr. | |
| 4,660,853 A * | 4/1987 | Jephcott | 280/5.509 |
| 4,974,863 A * | 12/1990 | Patin | 280/62 |
| 5,116,069 A * | 5/1992 | Miller | 280/5.509 |
| 5,427,424 A | 6/1995 | Robinson | |
| 5,765,846 A | 6/1998 | Braun | |
| 5,927,424 A | 7/1999 | Van Den Brink | |
| 5,941,548 A | 8/1999 | Owsen | |
| 6,276,480 B1 | 8/2001 | Aregger | |
| 6,328,125 B1 | 12/2001 | Van Den Brink et al. | |
| 6,435,522 B1 * | 8/2002 | Van Den Brink et al. | 280/5.509 |
| 6,481,526 B1 | 11/2002 | Millsap et al. | |
| 6,550,565 B2 | 4/2003 | Thomas et al. | |
| 6,612,392 B2 | 9/2003 | Park et al. | |
| 6,863,288 B2 | 3/2005 | Van Den Brink et al. | |
| 6,899,196 B2 | 5/2005 | Husain et al. | |
| 6,938,720 B2 | 9/2005 | Menjak et al. | |
| 7,063,334 B2 * | 6/2006 | Lim | 280/5.506 |
| 7,066,901 B2 | 6/2006 | Kuth et al. | |
| 7,090,234 B2 * | 8/2006 | Takayanagi et al. | 280/124.103 |
| 7,172,045 B2 * | 2/2007 | Takayanagi et al. | 180/210 |
| 7,445,070 B1 * | 11/2008 | Pickering | 180/211 |
| 7,591,337 B2 * | 9/2009 | Suhre et al. | 180/210 |
| 7,600,596 B2 * | 10/2009 | Van Den Brink et al. | 180/210 |
| 7,641,207 B2 * | 1/2010 | Yang | 280/124.103 |
| 7,946,596 B2 * | 5/2011 | Hsu et al. | 280/5.509 |
| 8,141,890 B2 * | 3/2012 | Hughes et al. | 280/124.103 |
| 8,249,775 B2 * | 8/2012 | Van Den Brink | 701/38 |
| 8,251,375 B2 * | 8/2012 | Hara et al. | 280/5.509 |
| 8,256,555 B2 * | 9/2012 | Ackley | 180/210 |
| 8,596,660 B2 * | 12/2013 | Hsu et al. | 280/124.103 |
| 8,602,421 B2 * | 12/2013 | Mercier | 280/5.509 |
| 8,607,913 B2 * | 12/2013 | Daniels | 180/210 |
| 8,607,914 B2 * | 12/2013 | Lee et al. | 180/211 |
| 8,613,340 B2 * | 12/2013 | Hsu et al. | 180/215 |
| 8,641,064 B2 * | 2/2014 | Krajekian | 280/124.103 |
| 2004/0020708 A1 | 2/2004 | Szabela | |
| 2004/0100059 A1 * | 5/2004 | Van Den Brink et al. | 280/124.103 |
| 2005/0077098 A1 * | 4/2005 | Takayanagi et al. | 180/215 |
| 2005/0217909 A1 * | 10/2005 | Guay et al. | 180/68.4 |
| 2005/0247505 A1 * | 11/2005 | Nagle | 180/312 |
| 2007/0193803 A1 * | 8/2007 | Geiser | 180/215 |
| 2008/0238005 A1 * | 10/2008 | James | 280/5.509 |
| 2009/0171530 A1 * | 7/2009 | Bousfield | 701/37 |
| 2009/0205894 A1 * | 8/2009 | Eaton | 180/210 |
| 2009/0312908 A1 * | 12/2009 | Van Den Brink | 701/38 |
| 2010/0072721 A1 * | 3/2010 | Plumley | 280/124.103 |
| 2010/0089678 A1 * | 4/2010 | Parsons | 180/211 |
| 2011/0036655 A1 | 2/2011 | Ackley | |
| 2011/0193308 A1 * | 8/2011 | Plumley | 280/124.103 |
| 2012/0185136 A1 * | 7/2012 | Ohnuma et al. | 701/48 |
| 2013/0297152 A1 * | 11/2013 | Hayashi et al. | 701/42 |

FOREIGN PATENT DOCUMENTS

| | | |
|---|---|---|
| EP | 1028883 B1 | 8/2000 |
| FR | 2646379 A1 | 11/1990 |
| JP | 59-118514 A | 7/1984 |
| JP | 02-182528 | 7/1990 |
| WO | WO 2011/059456 A1 | 5/2011 |

OTHER PUBLICATIONS

Gadda, Christopher David, "Optimal Fault-Detection Filter Design for Steer-By-Wire Vehicles", A Dissertation Submitted to the Department of Electrical Engineering and the Committee on Graduate Studies of Stanford University in Partial Fulfillment of the Requirements for the Degree of Doctor of Philosophy, Dec. 2008.

Gadda, et al. "Generating Diagnostic Residuals for Steer-By-Wire-Vehicles," IEEE Transactions on Control Systems Technology, vol. 15, No. 3, May 2007.

Pohl, et al. "A Research Threewheeler Vehicle With Processor Controlled Tilting and Steering Mechanism," REM 2006, Research and Education in Mechatronics, KTH, Stockholm, Sweden, Jun. 15-16, 2006.

Pimentel, Juan R. "Verification and Validation of a Safety-Critical Steer-By-Wire System Using DO-1788," Kettering University, SAE International, 2005.

Hsu, et al. "Stabilization of a Steer-By-Wire Vehicle At the Limits of Handling Using Feedback Linearization," Proceedings of IMECE2005, 2005 ASME International Mechanical Engineering Congress and Exposition, Nov. 5-11, 2005, Orlando, Florida, USA.

Drew, et al. "System Development for Hydraulic Tilt Actuation of a Tilting Narrow Vehicle," The Ninth Scandinavian International Conference on Fluid Power, SICFP '05, Jun. 1-3, 2005, Linkoping, Sweden.

Hsu, et al. "A Feel for the Road: A Method to Estimate Tire Parameters Using Steering Torque," Stanford University, Dept. of Mechanical Engineering, Avec '06 (2006).

Switkes, et al. "Using Mems Accelerometers to Improve Automobile Handwheel State Estimation for Force Feedback," Proceedings of IMECE'04, 2004 ASME International Mechanical Engineering Congress and Exposition, Anaheim, CA USA, Nov. 13-19, 2004.

Yih, et al. "Steer-By-Wire for Vehicle State Estimation and Control," Stanford University, Dept. of Mechanical Engineering, Avec '04 (2004).

Palsetia, et al. "Fault Tolerance in Automotive X-By-Wire," University of Wisconsin-Madison, Electrical & Computer Engineering Department, Dec. 4, 2005.

Setlur, et al. "A Nonlinear Tracking Controller for a Haptic Interface Steer-By-Wire Systems," Proceedings of the 41st IEEE Conference on Decision and Control, Las Vegas, NV, Dec. 2002.

Nguyen, et al. "Direct Current Measurement Based Steer-By-Wire Systems for Realistic Driving Feeling," IEEE International Symposium on Industrial Electronics (ISIE 2009), Seoul Olympic Parktel, Seoul, Korea Jul. 5-8, 2009.

van den Brink et al. "Slender Comfort Vehicles: Offering the Best of Both Worlds", pp. 56-59, Jan. 2004.

van den Brink et al. DVC—The banking technology driving the CARVER vehicle class, 6 pages, AVEC 2004.

van den Brink, Chris, "Realization of High Performance Man Wide Vehicles (MWV's) With an Automatic Active Tilting Mechanism", Brink Dynamics, pp. 19, 1999.

Carver Europe BV, "Carver One" (2007).

Carver Europe BV, "The Making of the Carver One" (Jan. 2007).

Carver Europe BV, "Carver One—Key Information" (Jan. 2008).

Sensodrive, "Force-Feedback in Driving Simulators" (2011).

Laws et al. "Frequency Characteristics of Vehicle Handling: Modeling and Experimental Validation of Yaw, Sideslip, and Roll Modes to 8 Hz", pp. 1-6, Proceedings of AVEC '06—The $8^{th}$ International Symposium on Advanced Vehicle Control, Aug. 20-24, 2006.

Wilwert, et al. "Design of automotive X-by-Wire systems" May 2004.

Wilwert et al. "Evaluating Quality of Service and Behavioral Reliability of Steer-by-Wire Systems", Emerging Technologies and Factory Automation. Proceedings. ETFA '03, IEEE Conference (Sep. 2003).

X-By-Wire, "Safety Related Fault-tolerant Systems in Vehicles," Nov. 26, 1998.

Coudon et al. "A New Reference Model for Steer-By-Wire Applications with Embedded Vehicle Dynamics", American Control Conference, Jun. 14-16, 2006.

Suryanarayanan et al. "Experimental Validation of an Open-Loop Model for Handwheel Torque Prediction in Steer-by-Wire Vehicles", Proceedings of the International Symposium on Advanced Vehicle Control; pp. 227-232 (2006).

International Search Report and Written Opinion, PCT/US2013/049991, mailed on Nov. 7, 2013.

\* cited by examiner

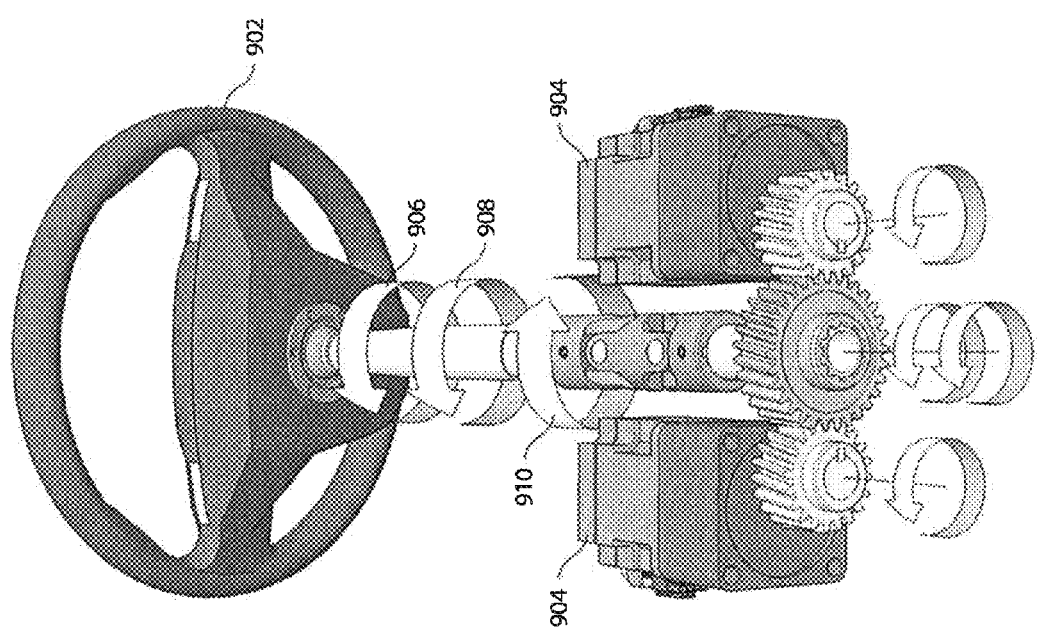

STEERING AND CONTROL SYSTEMS FOR A THREE-WHEELED VEHICLE

CROSS REFERENCE TO RELATED APPLICATIONS

This application claims benefit of U.S. provisional patent application Ser. No. 61/670,074, filed on Jul. 10, 2012, which is hereby incorporated by reference in its entirety.

BACKGROUND

The present disclosure relates to the field of vehicle technology and, in particular, to steering and control systems for a tilt-steering three-wheeled vehicle.

In conventional systems, a when a tilting three-wheeled vehicle initiates a turn, a cabin of the vehicle begins to lean. The leaning of the cabin may, subsequently, mechanically engage counter-steering of the front wheel. However, a very large amount of force is needed to initiate leaning of the vehicle. This places a high load on the lean actuators of the vehicle.

SUMMARY

One embodiment of the disclosure provides for a three-wheeled vehicle. The three-wheeled vehicle includes: a single front wheel; two rear wheels; a passenger cabin; an electronic steering control unit; and a steering input device configured to send an electronic signal to the electronic steering control unit corresponding to an input received at the steering input device associated with turning the three-wheeled vehicle; wherein the electronic steering control unit is configured to counter-steer the front wheel in response to receiving the electronic signal, wherein the counter-steering of the front wheel initiates a leaning of the passenger cabin a direction of turning of the three-wheeled vehicle.

Another embodiment provides an electronic steering control unit for a three-wheeled vehicle. The electronic steering control unit includes: an input unit configured to receive a first electronic signal corresponding to an input received at a steering input device, the first electronic signal associated with turning of the three-wheeled vehicle; and an output unit coupled an actuator arm that controls steering of a single front wheel of the three-wheeled vehicle, wherein, in response to receiving the first electronic signal from the input unit, the output unit is configured to send a second electronic signal to the actuator arm to counter-steer the front wheel, wherein the counter-steering of the front wheel initiates a leaning of a passenger cabin of the three-wheeled vehicle a direction of turning of the three-wheeled vehicle.

BRIEF DESCRIPTION OF THE DRAWINGS

FIG. 3 is a schematic diagram of a vehicle including electronic rear wheel steering, according to one embodiment.

FIG. 9 is a conceptual diagram illustrating a steering control system, according to one embodiment.

DETAILED DESCRIPTION

Figure 1:
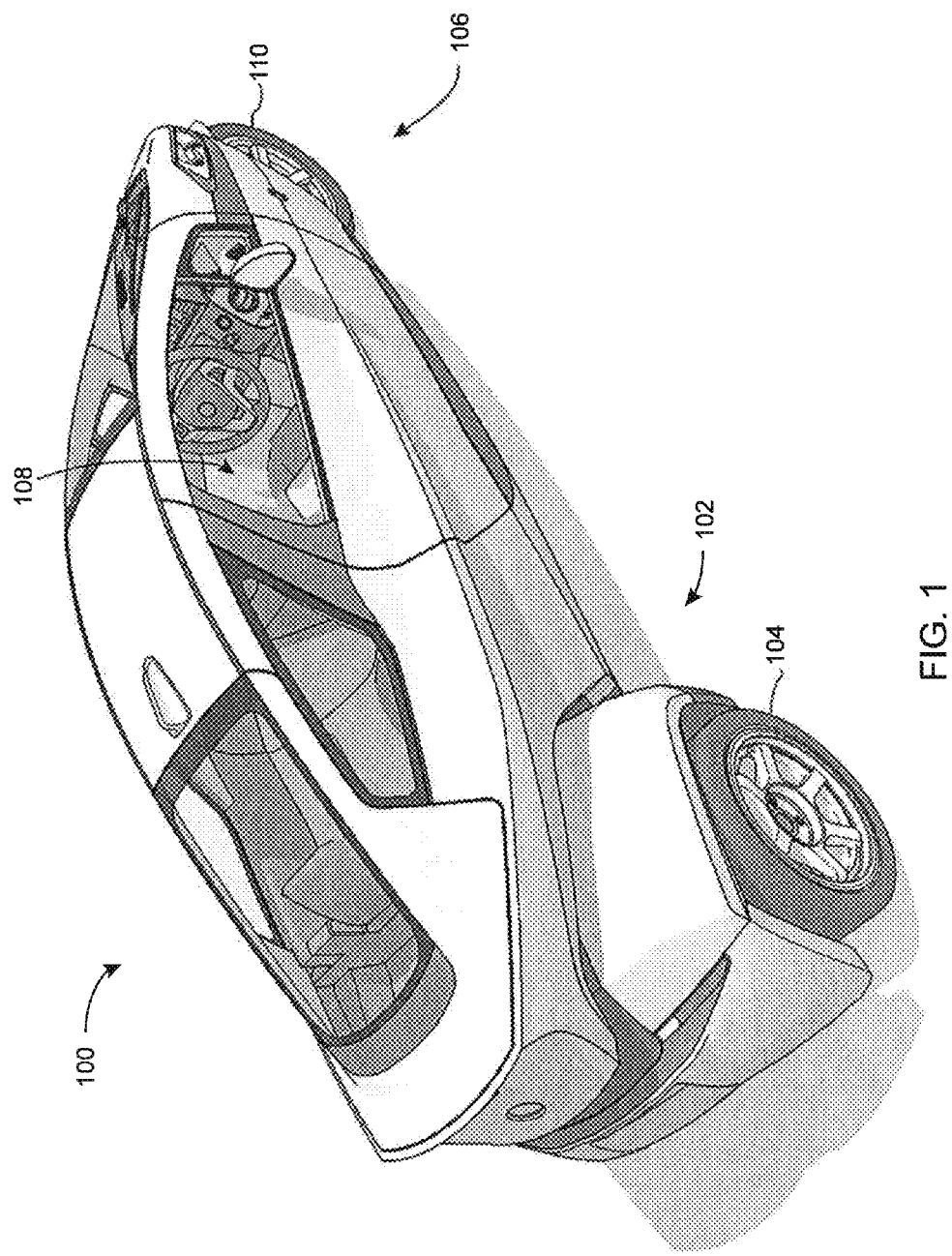
FIG. 1 is an example of a three-wheeled vehicle, according to one embodiment.

Some embodiments described herein generally relate to a three-wheeled vehicle having two rear wheels and one front wheel. FIG. 1 is an example of a three-wheeled vehicle 100, according to one embodiment. A rear section 102 of the vehicle 100 includes the two rear wheels 104 and a motor that drives the rear wheels 104. A front section 106 of the vehicle 100 includes a passenger cabin 108 and a front wheel 110. The front section 106 is rotatable relative to the rear section 102 about a longitudinal axis such that the front section 106 can lean during turning.

According to various embodiments, the vehicle 100 uses a drive-by-wire system, where the steering, motor control, and leaning of the front section 106 are controlled by a system of sensors, actuators, and computers. The steering wheel input, as well as the accelerator and braking inputs are received by an electronic control unit ("ECU"), which then computes signals to send to the various actuators and motors that control the steering, leaning, and propulsion of the vehicle 100. For example, measurements from a steering angle sensor, a steering wheel torque sensor, and speed sensors at each wheel contribute to the determination of tilt angle in a turn. The drive-by-wire system can also provide the driver with tactile feedback through a steering feedback actuator connected to the steering wheel to provide steering feedback to the driver in a turn.

In various embodiments, the disclosed drive-by-wire system has several fault detection methods. For instance, encoders are typically built into the motors, such as the tilt motor and the front wheel steering motors. The encoders serve to provide the ECU with information on the positions of the tilt angle and the front wheel turn angle. Redundant sensors, such as the absolute bank angle encoder and the linear position sensor are used to detect any errors or inconsistencies in the measurements of the tilt angle and the front wheel turn angle, respectively.

In one embodiment, in order to lean the front portion of the vehicle, a single actuator is coupled to the rear portion and the front portion of the vehicle. The actuator is described as a worm gear that is rotated by a single or redundant motor setup to lean the front portion of the vehicle relative to the rear portion.

The drive-by-wire system is able to counter-steer the front wheel during the initial stages of a high speed turn, or a leaning turn. Counter-steering is the non-intuitive steering of the front wheel in the opposite direction of a turn to induce leaning into the turn. Counter-steering vastly reduces the amount of torque required to induce leaning of the front section of the vehicle. After the lean is initiated, the front wheel can be turned into the turn to complete the turn.

Three-wheeled leaning vehicles have a tendency to lose traction in the rear wheels during high speed turns. In some embodiments, the disclosed design addresses this problem by integrating a traction control system to the drive-by-wire system. For example, the traction control system uses the vehicles braking system to slow the inside wheel during a turn to maintain rear wheel contact with the ground and control of the vehicle during high speed turns.

Electronic Steering and Lean Control System

Some embodiments described herein provide an electronic control system for a leaning three-wheeled vehicle that is capable of optimizing lean and steering control in a wide range of driving conditions based on the input from a variety of sensors. Some embodiments described herein provide a control system and control routines for a leaning three-wheeled vehicle. For example, the control routines may include stability control as a function of steering and counter-steering to engage the lean turning of the vehicle.

One embodiment uses a yaw sensor to control a three-wheeled leaning vehicle. In addition, the yaw sensor can be used in combination with other sensors to implement the drive-by-wire system. The ECU in the vehicle is able to receive inputs from a number of sensors (examples provided below), and perform calculations to control and/or predict conditions that could lead to vehicle instability or loss of control. This is not possible using conventional approaches since, in prior systems, there is no provision for processing this kind of data in any sophisticated manner.

Figure 2:
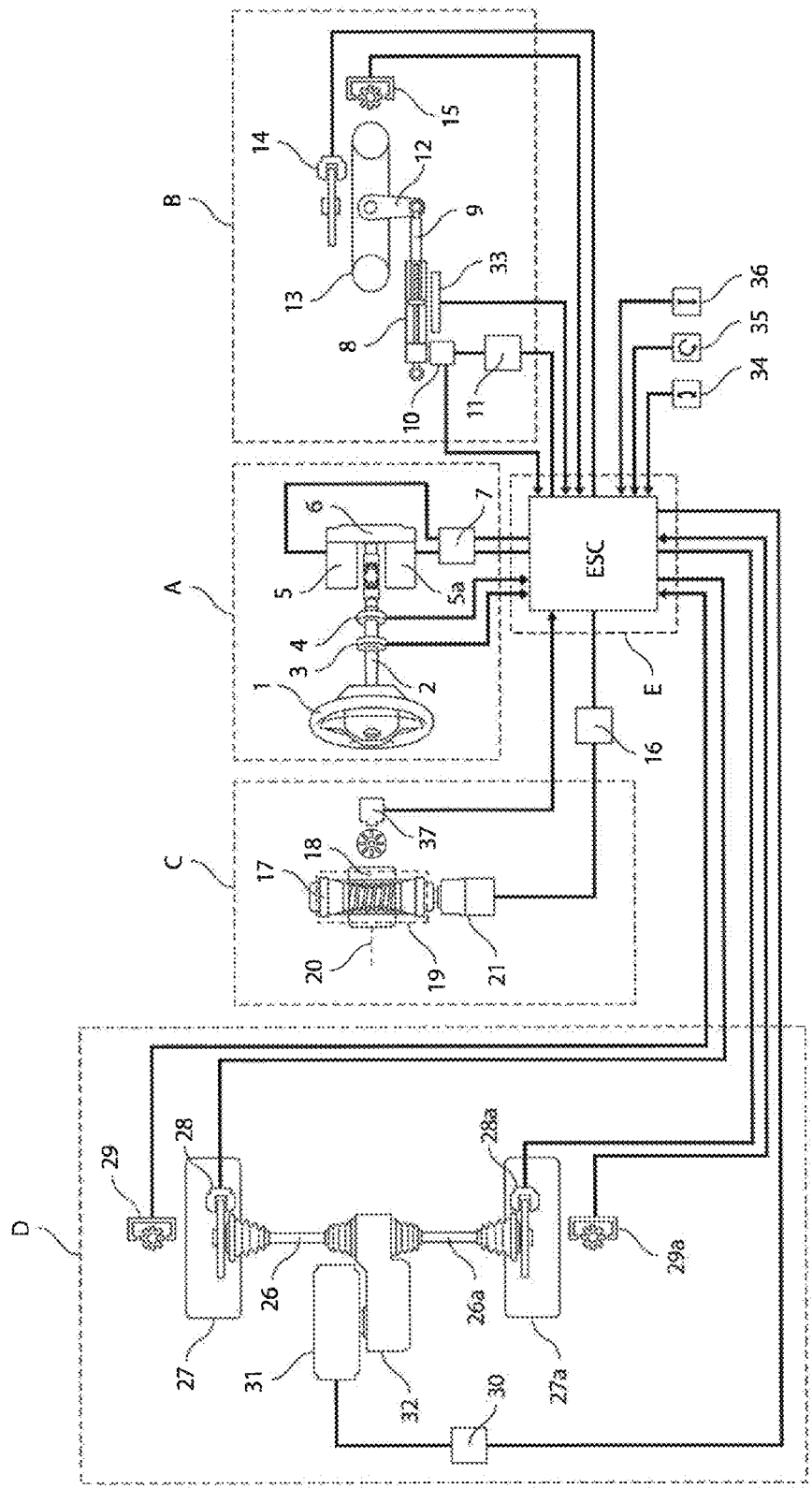
FIGS. 2 and 3 are schematic diagrams of a steering system configuration of a three-wheeled vehicle, according to certain embodiments.
Figure 3:
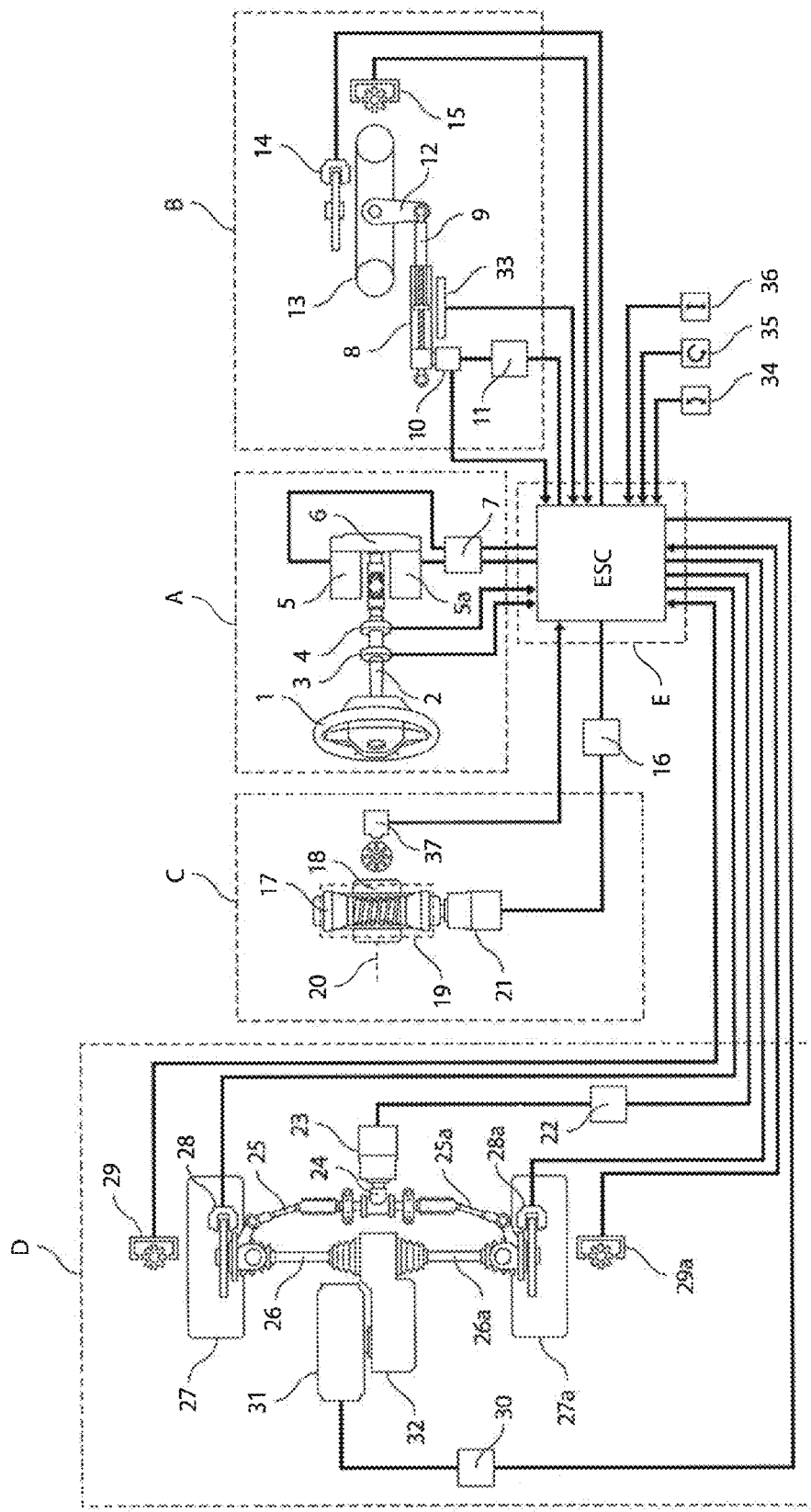

FIGS. 2 and 3 show, diagrammatically, the steering system configuration of a three-wheeled vehicle in accordance with some embodiments of the disclosure. Both figures describe a three-wheeled vehicle configuration having one wheel 13 in front and two wheels 27, 27a in the rear powered by an electric motor 31, drive motor controller 30, variable transmission 32, rear drive shafts 26,26a, an internal combustion motor, or a hybrid combination of the two.

Sections A (steer-by-wire steering assembly), B (front wheel assembly), and C (tilt control assembly) comprise the front section or "cabin" of the vehicle, while section D (propulsion module/rear wheel steering) is a separate propulsion module. These two sections are connected via the tilt actuator gearbox 19 along the vehicle's longitudinal axis. The cabin is held in an upright position relative to the propulsion module. At low speeds, there may be little to no lean of the cabin, while at high speeds the cabin lean can be as much as 45 degrees.

The vehicle configuration includes an electronic steering control unit ("ESC" or "E"), which is responsible for managing steering and vehicle stability functions. The vehicle also includes a plurality of sensors that provide information to the ESC (E). These sensors include a steering angle sensor 3, a steering torque sensor 4, a plurality of wheel speed sensors 14, 29, and 29a corresponding to each wheel, a transverse acceleration sensor 36, a yaw rate sensor 35, a roll sensor 34, a bank angle sensor 37, and a front steering arm position sensor 33. Naturally, other embodiments of the vehicle could include greater or fewer sensors. Sensed conditions and steering intent are converted into calibrated signals that are indicative of the operation of the vehicle and are communicated to the ESC (E).

The front wheel steering actuator 8 is driven by the ESC system (E) via the front wheel steering actuator motor controller 11 and front wheel steering motor 10. The steering angle of the front wheel 13 controlled by actuator rod 9 and steering arm 12, and is confirmed by the ESC via the linear position sensor 33. Front brake caliper 14 is also coupled to the front wheel. In normal driving, the amount of counter-steer applied to the front wheel 13 is calculated based upon the driver's intent via a steering input device 1, the steering shaft 2, the steering angle sensor 3, the steering torque sensor 4, the steering gearbox 6, and/or the vehicle's speed as determined by wheel speed sensors 15, 29, and 29a.

At lower vehicle speeds, no counter-steering is applied and the vehicle simply follows the front wheel in the intended direction of travel. At higher speeds, turning direction is based entirely on the vehicle's lean angle. This turning method is similar to a motorcycle turn and serves to highlight the difference between "turning" the vehicle like a car, and "lean-turning." No driver intervention is required since the ESC interprets the driver's intent based on speed, steering angle, and steering input force. As steering feedback in the form of resistance is supplied to the driver by actuators 5 and 5a, the driver feels no difference between "turning" and "lean-turning." The feedback actuators 5, 5a are motors, which are controlled by a motor controller. The ECS supplies feedback commands to the feedback actuators 5, 5a via the steering feedback controller 7. This communication runs both ways, in that the steering feedback controller 7 also relays torque and position data to the ECS.

In lean-turning, once front wheel counter-steering has initiated the lean-turn, the lean actuator rolls the cabin to the target lean angle required for the requested turn relative to a pivot axis 20 by a tilt motor 21, which can be mounted 18 to the cabin with a worm screw 17 and controlled by a tilt motor controller 16, while the front wheel 13 returns to the straight-ahead position. Under normal driving operations, the amount of torque required for this is nearly zero. In such a case, the actuator can best be described as "regulating" the lean-turn. Rolling out of a lean turn is also performed by counter-steering, in this case, by the ECS turning the front wheel into the lean turn, and using the lean actuator to bring the cabin to an upright position.

In one embodiment, rear stability control while maneuvering is performed by the ESC system via an integrated electronic stability control application or module. Upon detection of an unstable condition, or a condition that exceeds the vehicle's yaw, roll, or lateral acceleration targets, braking force is selectively applied to the rear calipers 28, 28a to bring the vehicle back to its intended course.

Alternatively, as shown in FIG. 3, rear stability control is effected via the rear wheel steering assembly 24 via rear wheel steering arms 25, 25a controlled by rear wheel steering motor controller 22. In this embodiment, rear steering is calculated based on lean angle, and controller via the rear wheel steering (RWS) actuator 23. Electronic stability control can also be implemented in this configuration.

Counter-Steering to Engage Leaning

In some embodiments, a vehicle's rollover threshold is established by the simple relationship between the height of the center of gravity (CG) and the maximum lateral forces capable of being transferred by the tires. Modern tires can develop a friction coefficient as high as 0.8, which means that the vehicle can negotiate turns that produce lateral forces equal to 80% of the vehicle's own weight before the tires lose adhesion (i.e., 0.8 G (units of standard gravity)). The CG height in relation to the effective half-tread of the vehicle determines the length-to-height (L/H) ratio, which establishes the lateral force required to overturn the vehicle. As long as the side-force capability of the tires is less than the side-force required for overturn, the vehicle will slide before it overturns.

Rapid onset turns impart a roll acceleration to the body of the vehicle that can cause the body to overshoot its steady-state roll angle. This happens with sudden steering inputs, when a skidding vehicle suddenly regains fraction and begins to turn again, and when a hard turn in one direction is followed by an equally hard turn in the opposite direction (i.e., slalom turns). The vehicle's roll moment depends on the vertical displacement of the center of gravity above its roll center. The degree of roll overshoot depends on the balance between the roll moment of inertia and the roll damping characteristics of the suspension. An automobile with 50% (of critical) damping has a rollover threshold that is nearly one third greater than the same vehicle with zero damping.

Overshooting the steady-state roll angle can lift the inside wheels off the ground, even though the vehicle has a high static margin of safety against rollover. Once lift-off occurs, the vehicle's resistance to rollover diminishes exponentially, which rapidly results in a condition that can become irretrievable. The roll moment of inertia reaches much greater values during slalom turns where the forces of suspension rebound and the opposing turn combine to throw the body laterally through its roll limits from one extreme to the other. The inertial forces involved in overshooting the steady-state roll angle can exceed those produced by the turn-rate itself.

Figure 4:
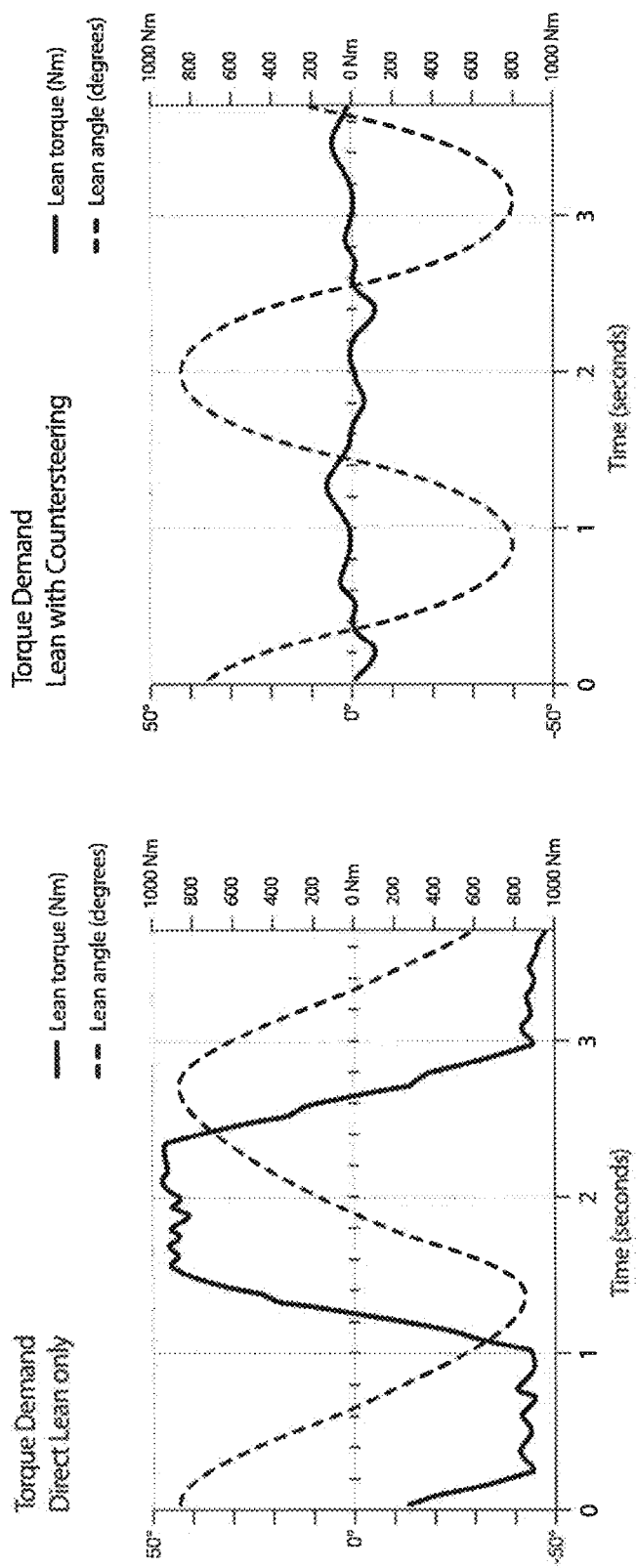
FIG. 4 is a conceptual diagram comparing torque demand for direct tilt versus tilt with counter-steering, according to one embodiment.

FIG. 4 is a conceptual diagram comparing torque demand for direct tilt versus tilt with counter-steering, according to one embodiment. As shown in FIG. 4, the use of front wheel counter-steering has a substantial influence on the actuator speed and torque demand during steering maneuvers. As shown in the diagram on the left in FIG. 4, an ISO Standard slalom maneuver at 100 km/hr without counter-steering requires a maximum available tilting torque of 1000 Nm, with a maximum tilting speed of only 49° per second. By contrast, as shown in the diagram on the right in FIG. 4, with counter-steering, the same maneuver requires only 100 Nm of available tilting torque—a full order of magnitude less. Tilting or maneuvering speed is also greatly increased to as much as 82° per second.

Figure 5:
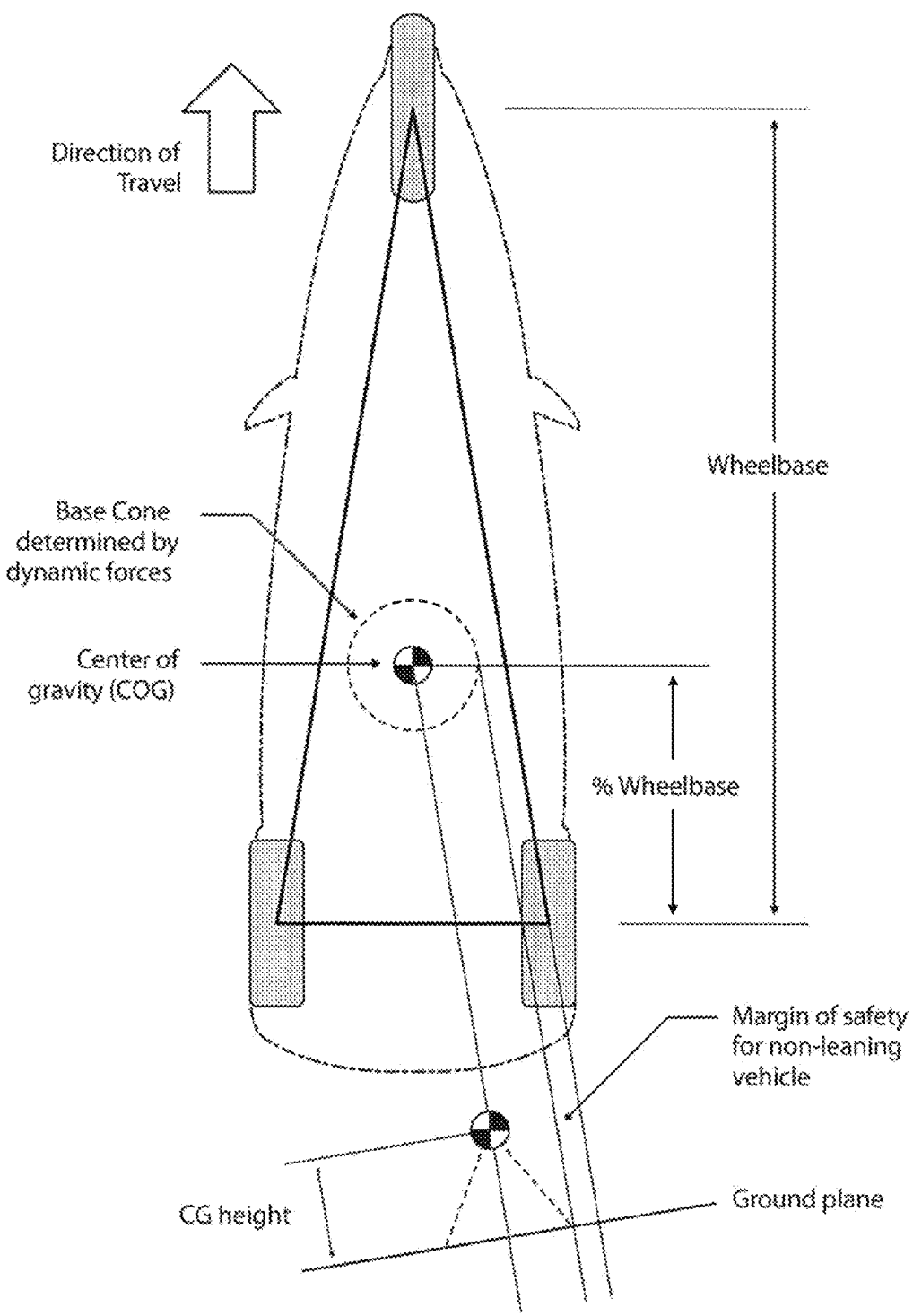
FIG. 5 is a conceptual diagram of a three-wheeled vehicle, according to one embodiment.

FIG. 5 is a conceptual diagram of a three-wheeled vehicle, according to one embodiment. A simple way to model a non-leaning three-wheeled vehicle's margin of safety against rollover is to construct a base cone using the CG height, its location along the wheelbase, and the effective half-tread of the vehicle. Maximum lateral G-loads are determined by the tire's friction coefficient. Projecting the maximum turn-force resultant toward the ground forms the base of the cone. A 1.0 G load acting across the vehicle's CG, for example, would result in a 45 degree projection toward the ground plane. If the base of the cone falls outside the effective half-tread, the vehicle will overturn before it skids. If it falls inside the effective half-tread, the vehicle will skid before it overturns.

In some implementations, the vehicle is a 1F2R (one front tire, two rear tires) design where the single front wheel and passenger compartment lean into turns, while the rear section, which carries the two side-by-side wheels and the powertrain, does not lean. The two sections are connected by a mechanical pivot. Tilting three-wheeled vehicles offer increased resistance to rollover and much greater cornering power—often exceeding that of a four-wheel vehicle. An active leaning system means that the vehicle does not require a wide, low layout in order to obtain high rollover stability. Allowing the vehicle to lean into turns provides much greater latitude in the selection of a CG location and the separation between opposing wheels.

The rollover threshold of this type of vehicle depends on the rollover threshold of each of the two sections taken independently. The non-leaning section behaves according to the traditional base cone analysis. Its length-to-height ratio determines its rollover threshold. Assuming there is no lean limit on the leaning section, it would behave as a motorcycle and lean to the angle necessary for balanced turns. The height of the center of gravity of the leaning section is critical, as long as there is no effective lean limit.

In some embodiments, the rollover threshold of a tilting three-wheeled vehicle is determined by the same dynamic forces and geometric relationships that determine the rollover threshold of conventional vehicles—except that the effects of leaning become a part of the equation. As long as the lean angle matches the vector of forces in a turn, then, just like a motorcycle, the vehicle has no meaningful rollover threshold. In other words, there will be no outboard projection of the resultant in turns, as is the case with non-tilting vehicles.

In a steadily increasing turn, the vehicle will lean at greater and greater angles, as needed to remain in balance with turn forces. Consequently, the width of the track is largely irrelevant to rollover stability under free-leaning conditions. With vehicles having a lean limit, however, the resultant will begin to migrate outboard when the turn rate increases above the rate that can be balanced by the maximum lean angle. Above lean limit, loads are transferred to the outboard wheel, as in a conventional vehicle.

The rollover threshold of a vehicle without an effective lean limit will be largely determined by the rollover threshold of the non-leaning section. But the leaning section can have a positive or negative effect, depending on the elevation of the pivot axis at the point of intersection with the centerline of the side-by-side wheels. If the pivot axis (i.e., the roll axis of the leaning section) projects to the axle centerline at a point higher than the center of the wheels, then it will reduce the rollover threshold established by the non-leaning section. If it projects to a point that is lower than the center of the side by-side wheels, then the rollover threshold will actually increase as the turn rate increases. In other words, the vehicle will become more resistant to overturn in sharper turns. If the pivot axis projects to the centerline of the axle, then the leaning section has no effect on the rollover threshold established by the non-leaning section.

Embodiments of the invention provide for counter-steering the front wheel to induce leaning Counter-steering is the technique used by single-track vehicle operators, such as cyclists and motorcyclists, to initiate a turn toward a given direction by momentarily steering counter to the desired direction ("steer left to turn right").

U.S. Pat. No. 6,435,522 discloses a system having "opposite-steering," more commonly referred to as "counter-steering." This steering method is employed by motorcycles to initiate lean steering. However, the system in U.S. Pat. No. 6,435,522 relies on hydraulic signals from the rear leaning actuators to control the opposite-steering of the front wheel. In other words, the vehicle in U.S. Pat. No. 6,435,522 must actually start to lean before the front wheel counter-steering is engaged.

By contrast, embodiments disclosed herein use counter-steering to induce the leaning, where the front wheel is steered before the vehicle leans. Counter-steering the front wheel greatly reduces the amount of torque required to lean the vehicle body. In the system in U.S. Pat. No. 6,435,522, a high degree of torque (e.g., as much as 1000 Nm (Newton-meters)) is required to initiate the leaning of the vehicle before the front wheel can opposite-steer. Doing so requires massive hydraulic actuators and high-pressure hydraulics on the vehicle.

Figure 6:
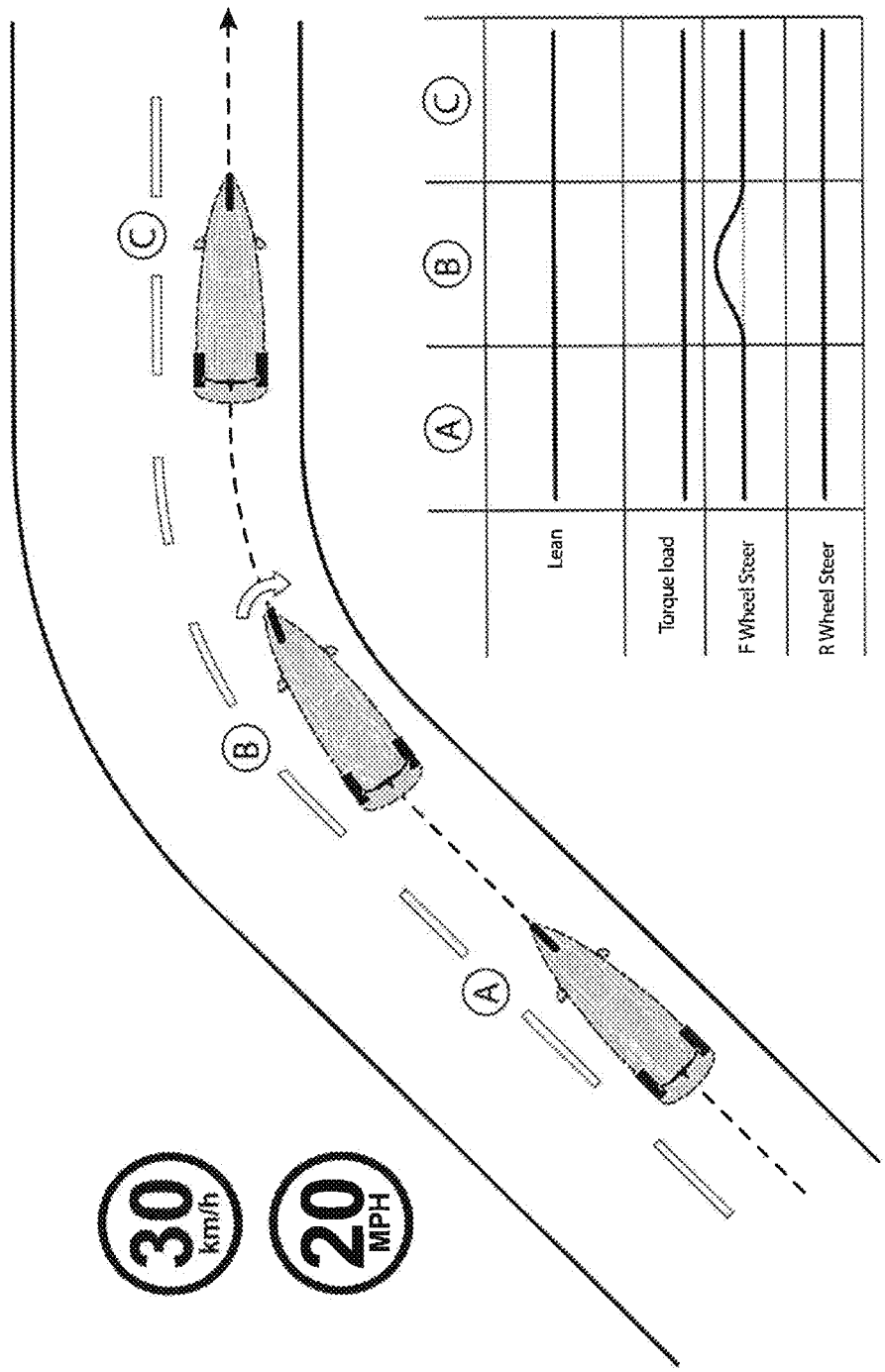
FIG. 6 is a conceptual diagram illustrating steering a three-wheeled vehicle at low speeds, according to one embodiment.

In one embodiment, at speeds below a certain threshold speed (for example, 30 km/hr (kilometers per hour), the vehicle steers by turning the front wheel into the turn. FIG. 6 is a conceptual diagram illustrating steering a three-wheeled vehicle at low speeds, according to one embodiment. At low speeds, the vehicle is sufficiently stable to safely turn without leaning up to this speed. The counter-steer value increasingly influences the target wheel deflection, creating a degree of under-steer at the limit of this threshold. As shown in FIG. 6, at time A, the vehicle is moving forward; at time B, the vehicle is turning; and, at time C, the vehicle is again moving forward. As shown in the timing chart in FIG. 6, there is no lean imparted to the vehicle when completing a turn at low speeds. The front wheel steers in the direction of the turn and the back wheels do not steer.

However, beyond the threshold speed (for example, above 30 km/hr), active front wheel steering is effectively disabled. Counter-steer is used by the Electronic Steering Control (ECS) to initiate and control lean steering.

Figure 7:
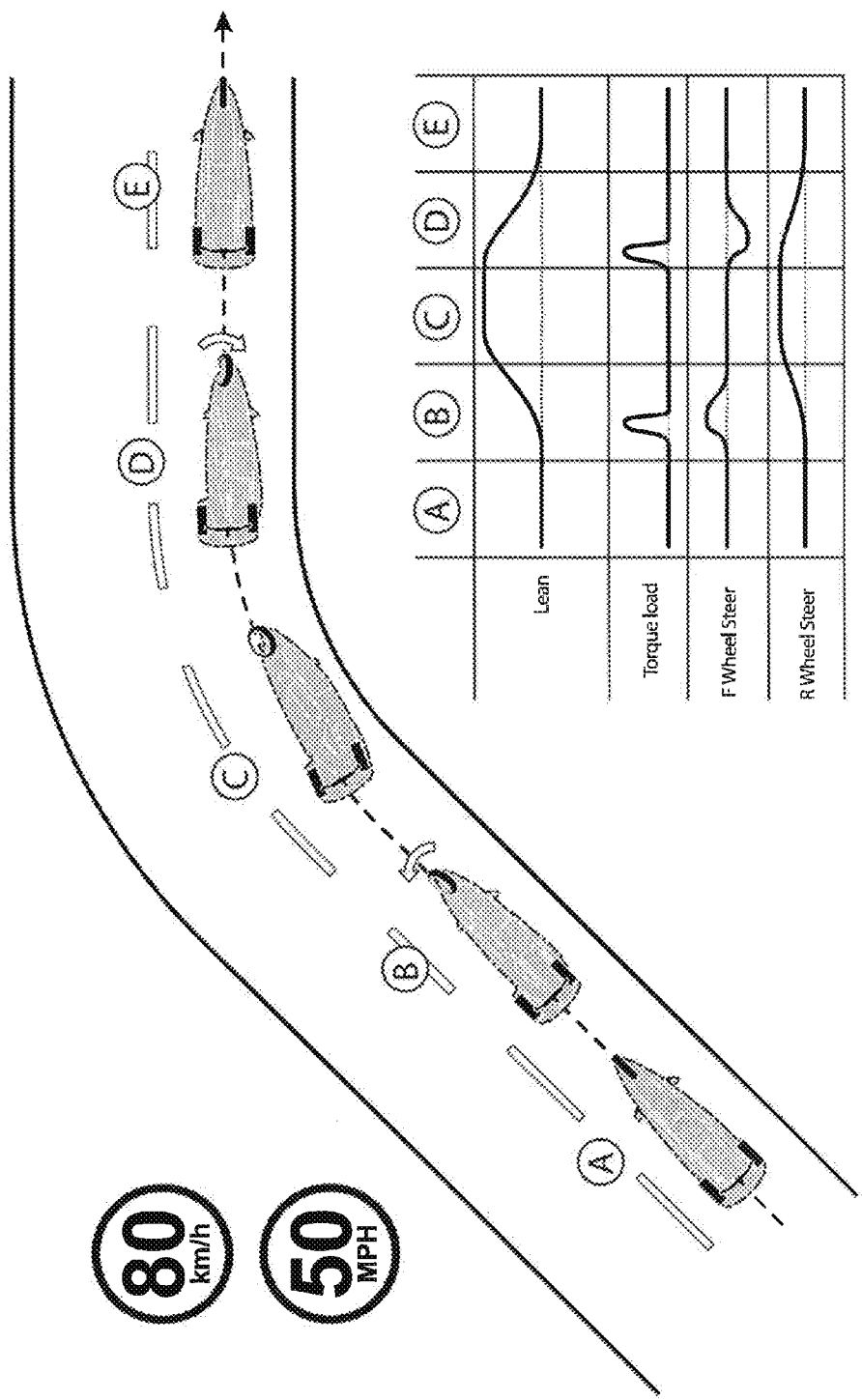
FIG. 7 is a conceptual diagram illustrating steering a three-wheeled vehicle at high speeds, according to one embodiment.

FIG. 7 is a conceptual diagram illustrating steering a three-wheeled vehicle at high speeds, according to one embodiment. At speeds above a certain threshold, for example, above 30 km/hr, steering wheel angle and torque are interpreted as lean intent. When an operator of a three-wheeled vehicle engages the vehicle into a turn at high speed (for example by turning a steering wheel or engaging a joystick), counter-steering is used to initiate lean based on these inputs, along with vehicle speed, yaw, roll, and transverse acceleration. Rear-wheel steering is mechanically coupled to lean angle. Peak torque loads typically occur at roll initiation and recovery. In some embodiments, a possible exception would be an evasive maneuver at lower speeds where lean would be helpful in maintaining vehicle stability.

As shown in FIG. 7, at time A, the vehicle is moving forward; at time B, the vehicle begins turning using counter-steering; at time C, the vehicle is turning with the front wheel straight; at time D, the vehicle finishes the turn steering into the direction of the turn; and, at time E, the vehicle is again moving forward. As shown in the timing chart in FIG. 7, at time B, the vehicle is in the process of leaning towards the ground, at time C, the lean is stable, and at time D, the vehicle is coming out of the lean. At time B, the front wheel is counter-steering, at time C, the front wheel is directed forwards, and at time D, the front wheel is steering in the direction of the turn. As also shown, the rear wheel steering is based on and corresponds to the amount of lean. In some embodiments, little to no yaw is imparted to the propulsion module during leaning events. Actuator speed, and thus steering response, is coupled to load. In coordinated steering, torque loading is relatively low, compared to prior approaches. Lean rates as high as 80° per second can be achievable. Counter-steering is performed by a dedicated actuator and does not have a negative impact on lean rate.

Some embodiments provide for using a single electric actuator to control the lean angle of a three-wheeled vehicle. In some cases, using a single electric actuator helps decrease the cost and overall system efficiency. Conventional approaches (i.e., lean THEN counter-steer approaches) require much greater force to initiate a lean. The "counter-steer THEN lean" scheme disclosed herein allows for a single actuator since much less torque is needed. In some implementations, the single electric actuator has a worm gear drive.

By using a single actuator that drives the tilting of the vehicle, embodiments of the invention do not require a power-assisted tilt element comprising two drive elements connected to one another. Furthermore, the single actuator on the disclosed vehicle does not have a first limit position for a neutral position and a second limit position for tilting in one direction or an opposite direction. The actuator in the disclosed vehicle is not at any limit when in the neutral position. In fact, in the neutral position, the actuator is toward the center of its range of motion so that it can move either left or right to tilt the vehicle in either direction.

The actuator of the disclosed vehicle is substantially different and does not operate by simply traveling to limit positions. In some implementations, the disclosed vehicle's actuator rotates a worm gear to move a collar to different positions.

Rear Wheel Steering

In one embodiment, a vehicle can use rear-wheel steering that is mechanically linked to the vehicle's lean angle. By angling the rear wheels into the turn, this prevents a slip-induced oscillation in the rear of the vehicle. In one example embodiment, there is a physically connection between the front frame of the vehicle and the rear axle, which mechanically engages the steering of the rear wheels when the front frame of the vehicle is leaning.

In another embodiment, each rear wheel can be steered by a separate motor controller that coordinates both banking actuators and rear wheel steering.

In another embodiment still, the rear wheels can be steered by a single motor controller that coordinates both banking actuators and rear wheel steering. In some implementations, such as system may be limited to banking at 33°. A single actuator arm is electronically controlled by the ESC based on the lean angle of the front frame of the vehicle.

Figure 8:
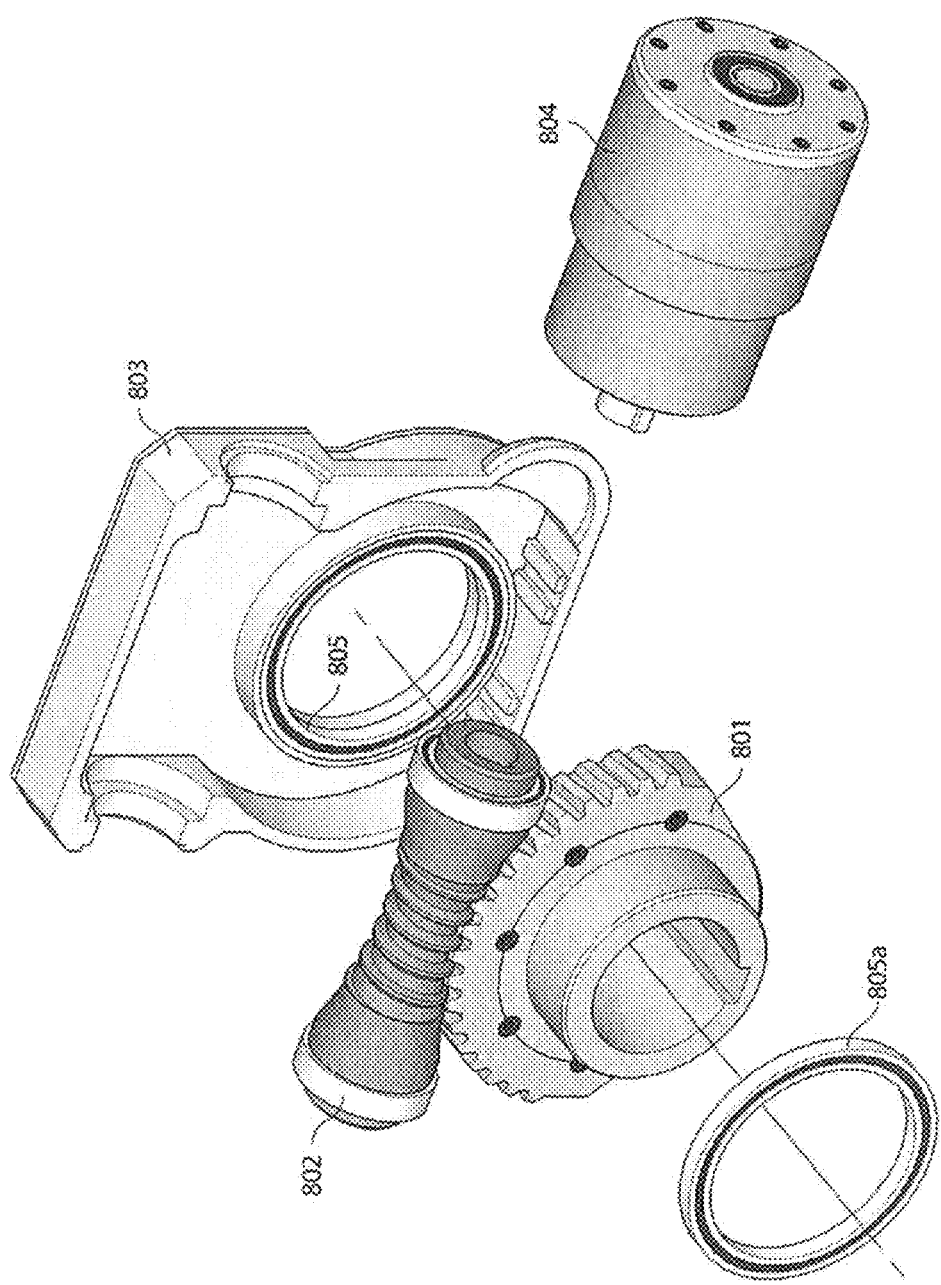
FIG. 8 is a conceptual diagram of an example rotary actuator, according to one embodiment.

In yet another embodiment, a rotary actuator may be used to control the steering of the rear wheels. FIG. 8 is a conceptual diagram of an example rotary actuator, according to one embodiment. The rotary motion of a motor 804 drives a worm screw 802 that rotates the tilt gear 801 plus or minus 45 degrees around its axis. The actuator gearbox 803 is mounted to the cabin section, while the rear propulsion module is securely attached to the tilt gear 801 core. Heavy-duty bearings 805, 805a ensure a smooth rotary motion of the assembly. Like linear actuators, this design is self-locking and allows for precise, repeatable positioning.

In another embodiment, the rear wheels can be steered using a stability or traction control system (TCS). In an example TCS, a speed sensor measures the speed of each wheel. A rotation rate sensor measures the vehicles rotation (i.e., yaw) around a vertical axis. A steering angle sensor attached to the steering wheel measures the driver's steering intention. A control unit receives signals from and sends signals to the speed sensors, the rotation rate sensor, and the steering angle sensor to control hydraulic units that build up and/or reduce braking pressure in the brakes. In one example, the speed of the rear wheel inside a turn is controlled (e.g., slowed down) to adjust the vehicle's rear stability. This would eliminate the need for a rear-steering rack assembly, steerable wheel hubs, and other suspension elements. In another implementation, instead of slowing down the inner rear wheel on a turn, the outer rear wheel can be sped up to control stability. In yet another implementation, a combination of slowing the inner rear wheel and speeding up the outer rear wheel may be implemented.

Figure 10B:
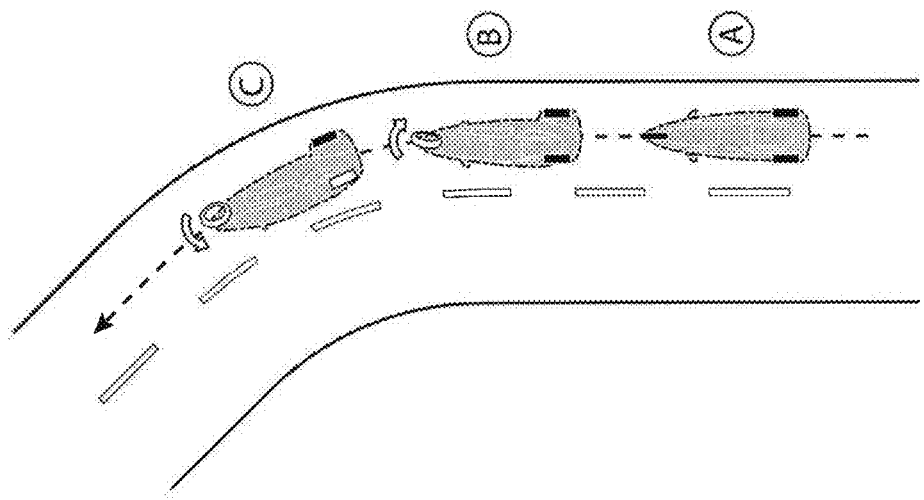
FIGS. 10A-10B are conceptual diagrams illustrating a comparison between rear wheel steering versus using electronic stability control, according to one embodiment.
Figure 10A:
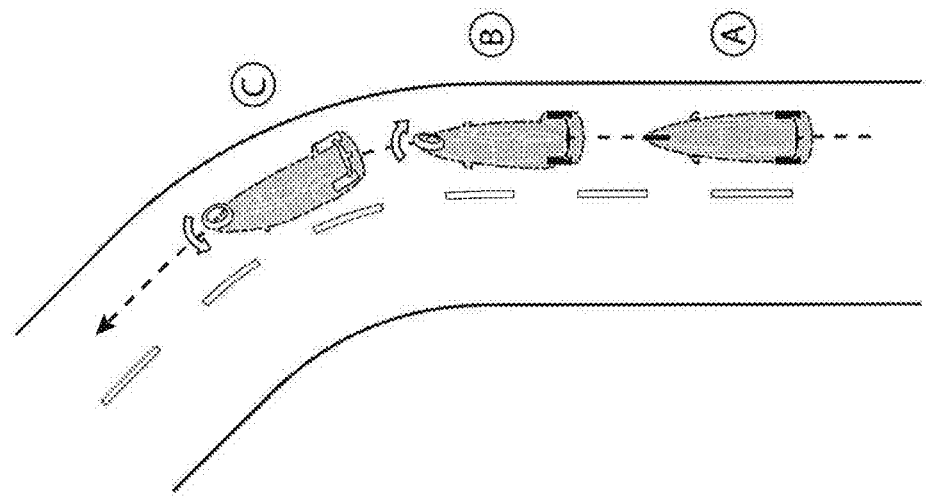

FIGS. 10A-10B are conceptual diagrams illustrating a comparison between rear wheel steering versus using traction control, according to one embodiment.

In FIG. 10A, rear wheel steering is mechanically linked to lean angle. At time (1), the vehicle is approaching a turn. A driver begins to apply torque to the steering wheel. At time (2), based on the vehicle speed, the hydraulics begin to lean the cabin into the turn, causing the front wheel to counter-steer. This places a moderate to high load on the lean hydraulics. At time (3), the front wheel returns to the ahead position. The lean angle increases in response to the driver steering wheel torque input. Rear wheels steer mechanically into the turn as lean increases. In this situation, understeer remains a concern.

In FIG. 10B, active steering, traction and stability control respond to conditions and driver intent. At time (1), the vehicle is approaching a turn. Stability and traction control is active. A driver begins to turn the steering wheel. At time (2), based on the vehicle speed, the calculated driver intent, and other dynamic forces, the front wheel to counter-steers to lean the cabin into the turn. The load on the lean actuators is minimal, for example, close to zero. Torque feedback increases on steering in response. At time (3), the front wheel returns to the ahead position. The steering system controls speed on the rear wheels as needed to maintain turn control.

Hand-Wheel Input Controller (Steering Interface)

FIG. 9 is a conceptual diagram illustrating a steering control system, according to one embodiment. Some embodiments of the disclosure provide for a steering controller comprising a hand-wheel 902, similar to that of a typical 4-wheel car. In another implementation, a joystick may be used to control steering instead of a hand-wheel. Like a car, the steering controller is used to control the vehicle's direction while maneuvering. The steering controller as disclosed uses two redundant actuators 904 which have a 180° relationship to one another, are similarly configured (for example, identically, but oppositely, configured), and perform the same or identical functions. The actuators 904 provide not only steering force and control feedback, but also act to measure the steering angle. Steering intent 906 and steering torque input 908 are measured by sensors in the steering control system. Steering feedback 910 can be sent back up the steering column to the hand-wheel. Thus, separate shaft mounted steering position sensors may be unnecessary since both actuators may include their own optical encoders, and can determine steering angle directly.

Since such a system is fully-electronic in nature, force feedback, input torque, and input control ratios can be adjusted dynamically. This can be done as a function of vehicle speed, driving situation, or as simply as a user preference. The dual-actuator design of the steering controller provides that in the event of an actuator failure, the remaining functional actuator is fully capable of performing all system requirements, with only a minor loss of high-end feedback torque. Steering control would be unaffected. In one implementation, the dual actuator design can be implemented on aircraft, including military aircraft.

Embodiments disclosed herein include a hydraulic-based steering mechanism. According to some embodiments, the vehicle can be implemented using a drive-by-wire system wherein the steering, motor control, and leaning of the front section are controlled by a system of sensors, actuators, and computers. The steering wheel input, as well as the accelerator and braking inputs are received by an electronic control unit ("ECU"), which then computes signals to send to the various actuators and motors that control the steering, leaning and propulsion of the vehicle. For example, measurements from a steering angle sensor, a steering wheel torque sensor and speed sensors at each wheel contribute to the determination of tilt angle in a turn. The drive-by-wire system can also provide the driver with tactile feedback through a steering feedback actuator connected to the steering wheel to provide steering feedback to the driver in a turn.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A three-wheeled vehicle, comprising:
a single front wheel;
two rear wheels;
a passenger cabin;
an electronic steering control unit; and
a steering input device configured to send an electronic signal to the electronic steering control unit corresponding to an input received at the steering input device associated with turning the three-wheeled vehicle;
wherein the electronic steering control unit is configured to counter-steer the front wheel in response to receiving the electronic signal, wherein the counter-steering of the front wheel initiates a leaning of the passenger cabin a direction of turning of the three-wheeled vehicle.

2. The three-wheeled vehicle of claim 1, further comprising a single actuator arm coupled to the front wheel configured to steer the front wheel in response to signals received from the electronic steering control unit.

3. The three-wheeled vehicle of claim 1, wherein the rear wheels are mechanically coupled to the passenger cabin and are configured to steer the rear wheels in the direction of turning of the three-wheeled vehicle in accordance with the leaning of the passenger cabin.

4. The three-wheeled vehicle of claim 1, further comprising a actuator arms coupled to the rear wheels, wherein the actuator arms are configured to steer the rear wheels in the direction of turning of the three-wheeled vehicle.

5. The three-wheeled vehicle of claim 4, wherein the actuator arms are configured to steer the rear wheels in the direction of turning of the three-wheeled vehicle based on steering signals received from the electronic steering control unit.

6. The three-wheeled vehicle of claim 1, further comprising a rotary actuator coupled to the rear wheels and configured to steer the rear wheels in the direction of turning of the three-wheeled vehicle.

7. The three-wheeled vehicle of claim 6, wherein the rotary actuator is configured to steer the rear wheels in the direction of turning of the three-wheeled vehicle based on steering signals received from the electronic steering control unit.

8. The three-wheeled vehicle of claim 1, further comprising a stability control unit coupled to the rear wheels and configured to receive stability control signals from the electronic steering control unit.

9. The three-wheeled vehicle of claim 8, wherein the stability control unit is configured to slow down the rotation of an inner rear wheel relative to the direction of turning of the three-wheeled vehicle.

10. The three-wheeled vehicle of claim 8, wherein the stability control unit is configured to increase the rotation of an outer rear wheel relative to the direction of turning of the three-wheeled vehicle.

11. The three-wheeled vehicle of claim 1, wherein the steering input device comprises a hand-wheel or a joystick.

12. The three-wheeled vehicle of claim 1, further comprising:
  a steering column coupled to the steering input device; and
  two redundant actuators rotationally coupled to the steering column and configured to detect steering direction intent and torque input of the steering input device.

13. The three-wheeled vehicle of claim 1, wherein the electronic steering control unit is configured to counter-steer the front wheel in response to receiving the electronic signal when the three-wheeled vehicle is travelling at a speed above a threshold speed.

14. The three-wheeled vehicle of claim 13, wherein the threshold speed is approximately 30 kilometers per hour.

15. An electronic steering control unit for a three-wheeled vehicle, comprising:
  an input unit configured to receive a first electronic signal corresponding to an input received at a steering input device, the first electronic signal associated with turning of the three-wheeled vehicle; and
  an output unit coupled an actuator arm that controls steering of a single front wheel of the three-wheeled vehicle, wherein, in response to receiving the first electronic signal from the input unit, the output unit is configured to send a second electronic signal to the actuator arm to counter-steer the front wheel, wherein the counter-steering of the front wheel initiates a leaning of a passenger cabin of the three-wheeled vehicle a direction of turning of the three-wheeled vehicle.

16. The electronic steering control unit of claim 15, further comprising:
  a second output unit configured to send a third electronic signal to a motor unit that controls actuator arms coupled to rear wheels of the three-wheeled vehicle, the actuator arms configured to steer the rear wheels in the direction of turning of the three-wheeled vehicle.

17. The electronic steering control unit of claim 15, further comprising:
  a second output unit configured to send a third electronic signal to a rotary actuator coupled to rear wheels of the three-wheeled vehicle, the rotary actuator configured to steer the rear wheels in the direction of turning of the three-wheeled vehicle.

18. The electronic steering control unit of claim 15, further comprising:
  a second output unit configured to send a third electronic signal to a stability control unit coupled to rear wheels of the three-wheeled vehicle, the stability control unit configured to control the rotation of each of the rear wheels.

19. The electronic steering control unit of claim 18, wherein the stability control unit is configured to slow down the rotation of an inner rear wheel relative to the direction of turning of the three-wheeled vehicle.

20. The electronic steering control unit of claim 18, wherein the stability control unit is configured to increase the rotation of an outer rear wheel relative to the direction of turning of the three-wheeled vehicle.

* * * * *